United States Patent [19]

Akuto

[11] Patent Number: 4,889,777
[45] Date of Patent: Dec. 26, 1989

[54] SECONDARY BATTERY AND METHOD OF MANUFACTURING THE SAME

[75] Inventor: Keiji Akuto, Sayama, Japan

[73] Assignee: Nippon Telegraph and Telephone Corporation, Tokyo, Japan

[21] Appl. No.: 227,370

[22] Filed: Aug. 2, 1988

[30] Foreign Application Priority Data

Aug. 7, 1987 [JP] Japan .................. 62-196415

[51] Int. Cl.⁴ .................. H01M 6/12; H01M 4/02
[52] U.S. Cl. .................. 429/162; 429/94; 429/209; 429/210; 29/623.4
[58] Field of Search .............. 429/162, 94, 209, 210; 29/623.4

[56] References Cited

U.S. PATENT DOCUMENTS

| 629,325 | 7/1899 | Ashley . | |
|---|---|---|---|
| 629,372 | 7/1899 | Kennedy . | |
| 4,019,970 | 4/1977 | Fritz et al. | 204/32 R |
| 4,051,304 | 9/1977 | Snook | 429/94 |
| 4,137,627 | 2/1979 | Kinsman | 29/623.4 |

FOREIGN PATENT DOCUMENTS

| 2544134 | 10/1984 | France . | |
|---|---|---|---|
| 58-133769 | 8/1983 | Japan | 429/162 |
| 59-228353 | 12/1984 | Japan | 429/162 |

Primary Examiner—Stephen J. Kalafut
Attorney, Agent, or Firm—Frishauf, Holtz, Goodman & Woodward

[57] ABSTRACT

A secondary battery has positive and negative electrode members juxtaposed on a substantially identical plane. End faces of the positive and negative electrode members oppose each other at a distance. A substrate fixes and supports the positive and negative electrode members. A cover member defines, with the substrate, a sealed chamber includng the positive and negative electrode members. An electrolyte is sealed in the sealed chamber. The battery can be manufactured a through deposition of electrode materials.

24 Claims, 7 Drawing Sheets

SECONDARY BATTERY AND METHOD OF MANUFACTURING THE SAME

BACKGROUND OF THE INVENTION

1. Field of the Invention

The present invention relates to a secondary battery and a method of manufacturing the same and, more particularly, to a secondary battery which can be made thin without degrading its performance and a method of manufacturing the same.

2. Description of the Related Art

Most conventional thin batteries are primary batteries. Typical conventional thin secondary batteries are a thin sealed lead battery and a button type nickel-cadmium battery, which have been recently put on market.

Figure 1:
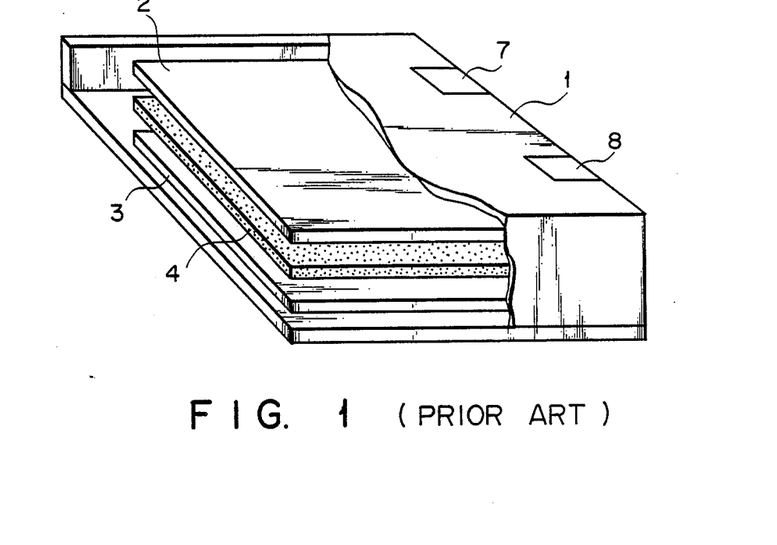
FIG. 1 is a partially cutaway perspective view of a conventional thin secondary battery.
Figure 2:
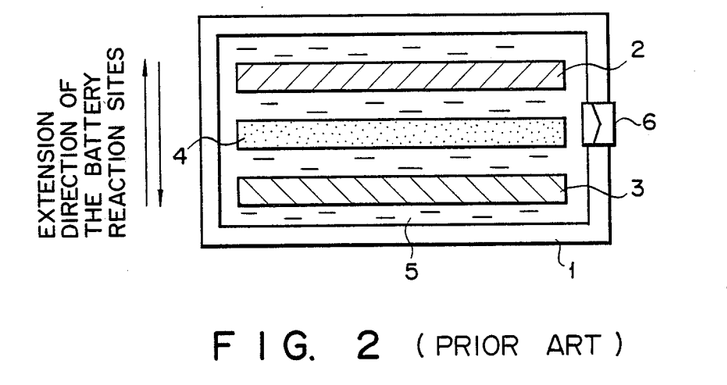
FIG. 2 is a horizontal sectional view of the conventional secondary battery shown in FIG. 1.

Referring to FIG. 1 (partially cutaway perspective view) and FIG. 2 (horizontal sectional view), a conventional thin secondary battery has positive and negative electrodes 2 and 3 each generally having a flat plate shape. Positive and negative electrode plates 2 and 3 are arranged in battery case 1 such that their major surfaces oppose each other. Separator 4 is interposed between electrodes 2 and 3. Electrolyte 5 is filled in battery case 1. Relief valve 6, positive terminal 7 and negative terminal 8 are provided on battery case 1.

As described above, the conventional thin secondary battery has a structure wherein positive electrode plate 2, negative electrode plate 3, and separator 4 which are the main constituting elements of the battery are positioned one above the other in a direction of thickness thereof.

In order to decrease the height of the battery having the above structure, the thicknesses of positive and negative electrode plates 2 and 3 may be reduced. However, the decrease in thickness is limited due to the following reasons.

Figure 3:
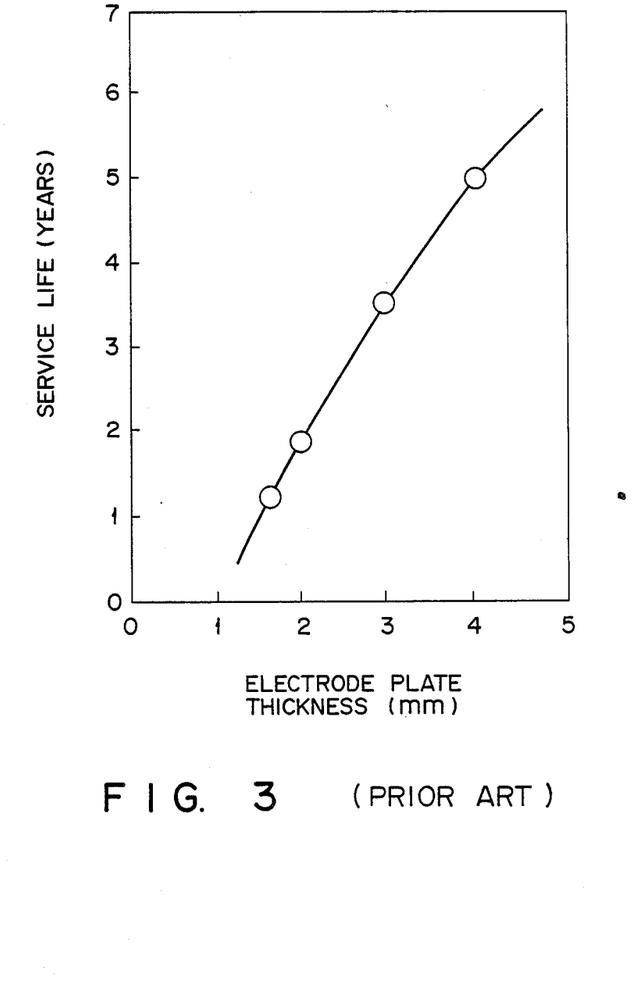
FIG. 3 is a graph showing the relationship between the thickness of the electrode of the conventional secondary battery and the battery service life.

The service life of the conventional secondary battery having the above structure greatly depends on the thickness of the electrode plate (positive electrode plate). As is well known in the art, when the thickness of the electrode plate is reduced, the service life of the battery is shortened. Taking a conventional lead battery having the above structure as an example, the relationship between the thickness of the electrode plate and the service life under use with a trickle charge is shown in FIG. 3. As is apparent from FIG. 3, the service life of the conventional battery is abruptly shortened when the thickness of the electrode plate is reduced. When the thickness of the electrode plate is 1 mm or less, the battery cannot be repeatedly used as a secondary battery due to the following reason. In the conventional secondary battery structure, the battery reaction sites generated by charge/discharge extends in a direction perpendicular to the major surface of the electrode plate (i.e., the direction of thickness), as indicated by arrows in FIG. 2. In order to cause any battery to function as a secondary battery, a portion which is not associated with the battery reaction, i.e., an energy concentration portion must always be present in the electrode. When the thickness of the electrode plate is reduced, the energy concentration portion disappears upon charge/discharge. Therefore, the secondary battery cannot serve as a battery. This situation also occurs when the battery is cyclically used.

Due to the above reasons, a minimum overall thickness or height of the conventional thin sealed lead battery is 4 to 5 mm.

In order to manufacture the conventional secondary battery, casting, cutting, and rolling of the electrode plates are required, and an active material must be applied to the surface of the electrode plate. Therefore, the manufacturing process is considerably complicated. In addition, according to the conventional method, in order to manufacture batteries having different electrode plate shapes and different battery voltages, different manufacturing lines and individual manufacturing apparatuses are required for manufacturing different batteries. For this reason, it is difficult to satisfy a variety of needs for many types of batteries.

SUMMARY OF THE INVENTION

It is, therefore, an object of the present invention to provide a secondary battery which can be made thin without degrading its performance, and a method of manufacturing the same.

In order to achieve the above object, there is provided according to an aspect of the present invention a secondary battery, comprising:

positive and negative electrode members arranged on a substantially identical plane, end faces of the positive and negative electrode members opposing each other at a distance;

a substrate for fixing and supporting the positive and negative electrode members;

a cover member defining, with the substrate, a sealed chamber including the positive and negative electrode members; and an electrolyte sealed in the sealed chamber so as to be present between at least opposite end faces of the positive and negative electrode members, the electrolyte being associated with a battery reaction with the positive and negative electrode members.

In order to increase the area (i.e., an effective electrode area) of the opposed end faces of both the electrode members, opposed edges of both the electrode members have a wave-like shape (triangular or rectangular shape) or a helical shape when viewed from the top.

According to another aspect of the present invention, there is provided a method of manufacturing a secondary battery comprising the steps of:

applying a positive electrode material containing a positive electrode active material and a negative electrode material containing a negative electrode active material to a substrate to form positive and negative electrode members whose end faces oppose each other at a distance;

bonding a cover member to the substrate such that the cover member defines, with the substrate, a sealed chamber including the positive and negative electrode members; and filling an electrolyte associated with a battery reaction with the positive and negative electrode members so as to be present between at least the opposite end faces of the positive and negative electrode members.

DETAILED DESCRIPTION OF THE PREFERRED EMBODIMENTS

As described above, a secondary battery according to the present invention has the following characteristic feature. Positive and negative electrode members are arranged or juxtaposed on a substantially identical plane unlike the conventional structure wherein the positive and negative electrode members are arranged one above the other in the direction of thickness thereof. The end faces of both the electrode members are spaced apart from each other.

The present invention will be described in detail with reference to FIGS. 4 to 13. The same reference numerals denote the same parts throughout the drawings.

Figure 4:
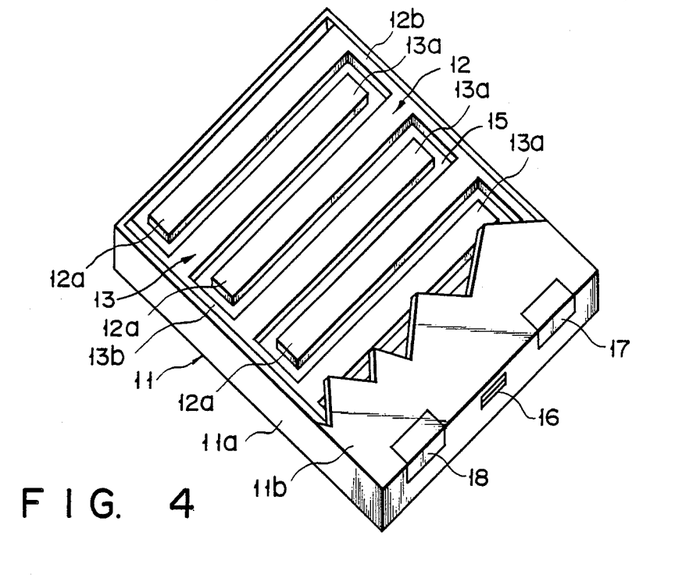
FIG. 4 is a partially cutaway perspective view of a secondary battery according to a first embodiment of the present invention.
Figure 5:
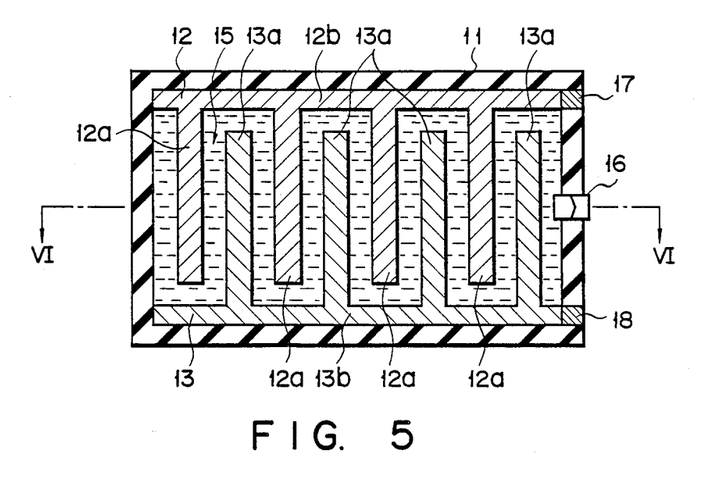
FIG. 5 is a horizontal sectional view of the secondary battery shown in FIG. 4.
Figure 6:
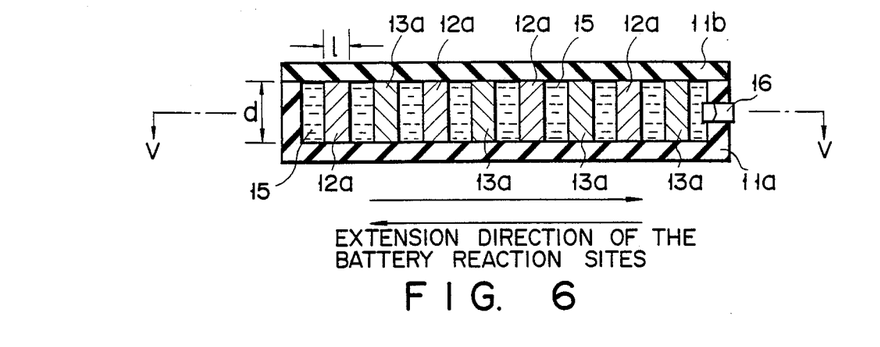
FIG. 6 is a sectional view of the secondary battery in FIG. 5 along the line VI—VI thereof.

FIGS. 4 to 6 show a secondary battery according to a first embodiment of the present invention. As shown in FIG. 4, interdigital positive and negative electrode members 12 and 13 are formed on one surface of flat substrate 11a. Electrolyte 15 associated with or involved in a battery reaction is filled in the space between the positive and negative electrode members 12 and 13.

Positive electrode member 12 is made of a positive electrode material containing a positive electrode active material, and negative electrode member 13 is made of a negative electrode material containing a negative electrode active material. In a lead battery, lead dioxide is the positive electrode active material and lead is a negative electrode active material therein. A liquid electrolyte such as sulfuric acid is used as electrolyte 15.

Cover member 11b covers electrode members 12 and 13 and is connected to substrate 11a. Cover member 11b cooperates with substrate 11a to constitute battery case 11 which defines a sealed chamber.

At least surfaces of substrate 11a and cover member 11b are electrically insulative and may be made of an acid-resistant polymer material (e.g., an acrylonitrilebutadiene-styrene resin (ABS resin) or a fluorine resin), a plastic material, or a glass-fiber reinforced plastic material. In order to prevent transmission of water vapor of a liquid electrolyte such as sulfuric acid, substrate 11a and cover member 11b may be made of a laminate material obtained by covering a metal layer (e.g., an aluminum layer) with an insulating polymer material, or of a polyvinylidene chloride resin.

Battery case 11 also has positive and negative terminals 17 and 18, and relief valve 16 which communicates with a space between electrode members 12 and 13.

As is best illustrated in FIG. 5, positive electrode member 12 has a comb-like shape. A plurality of rectangular teeth 12a having a substantially identical shape extend from spine 12b at predetermined intervals. Negative electrode member 13 also has a comb-like shape. A plurality of rectangular teeth 13a having a substantially identical shape extend from spine 13b at predetermined intervals. Teeth 12a do not contact teeth 13a and constitute an interdigital electrode structure. Thus, the end faces of positive and negative electrode members 12 and 13 oppose each other.

Referring to FIG. 6 (thickness d of each positive electrode tooth 12a and the negative electrode tooth 13a is emphasized, however, in practice, thickness d is considerably smaller than width l of teeth 12a and 13a), cover member 11b covers in tight contact with the surfaces of electrode members 12 and 13, so that electrolyte 15 does not enter between cover member 11a and electrode members 12, 13 to contact the upper surfaces of electrode members 12 and 13.

As described above, in the secondary battery of the present invention, positive and negative electrodes 12 and 13 are arranged on the surface of substrate 11a, i.e., on an identical plane. As compared with the conventional secondary battery wherein these members are arranged one above the other in the direction of thickness (FIGS. 1 and 2), even if the electrode member has the same thickness as that of the conventional battery, the battery thickness can be reduced to about ½ that of the conventional battery.

As indicated by arrows in FIG. 6, in the secondary battery of the present invention, the extension direction of the sites of the battery reaction during charge/discharge is different from that of the conventional battery. The battery of the present invention has the extension direction perpendicular to the direction of thickness of the electrode member (i.e., parallel to the direction of width l of the tooth of the electrodes). For this reason, width l of teeth 12a and 13a (unit electrode) must be assured to be preferably 1-2 mm or more. If this is assured, thickness d of the electrode can be reduced to 1 mm or less, e.g., 0.1 mm in order to assure the same or longer battery service life as or than that of a commercially available conventional thin secondary battery. In the secondary battery of the present invention, even if an electrode member has small thickness d, large width l can prevent disappearance of the energy concentration portion during charge/discharge. Therefore, the overall thickness of the secondary battery according to the present invention can be reduced to 1 mm or less.

A method of manufacturing the secondary battery according to the present invention as described above by using screen printing will be described with reference to FIGS. 7A to 7E.

Figure 7A:
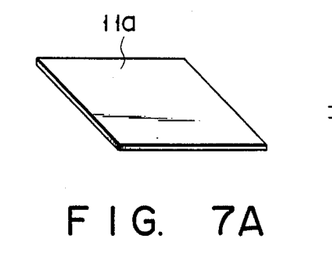
FIGS. 7A to 7E are views for explaining a method of manufacturing the secondary battery according to the present invention.

As shown in FIG. 7A, substrate 11a is prepared.

Figure 7B:
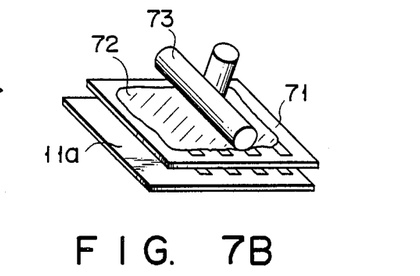

As shown in FIG. 7B, an active material-containing electrode material such as lead paste 72 is applied to substrate 11a by using roller 73 through screen 71 having a predetermined pattern (an interdigital pattern in this case). The positive and negative electrode member patterns can be simultaneously formed. The thickness of the lead paste is, e.g., 0.1 mm.

If a bonding force between the lead paste and substrate 11a is weak, an adhesive may be applied to the surface of substrate 11a in advance or a lead paste containing an adhesive may be used.

Figures 7C, 7D:
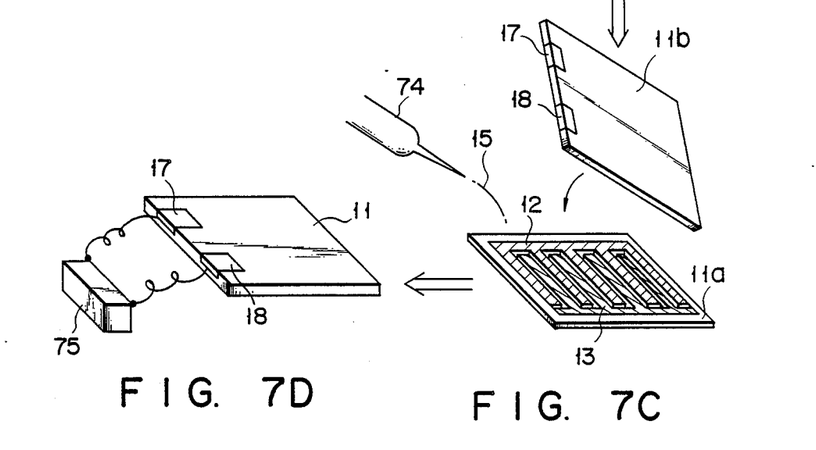

As shown in FIG. 7C, electrolyte solution 15 is injected from electrolyte injection nozzle 74 to a space between positive and negative electrode member patterns 12 and 13. The electrolyte may be, e.g., sulfuric acid having a concentration of 30 to 50%, preferably 35 to 45%. Cover member 11b having positive and negative terminals 17 and 18 is adhered to substrate 11a by using an adhesive, e.g., an epoxy adhesive.

Electrolyte 15 may be injected after cover member 11b is bonded to substrate 11a.

As shown in FIG. 7D, a formation treatment of the electrodes is performed using DC power source 75. This treatment allows conversion of the positive electrode active material into lead dioxide, and conversion of the negative electrode active material into lead. If necessary, the electrolyte may be further injected after the above formation treatment.

Figure 7E:
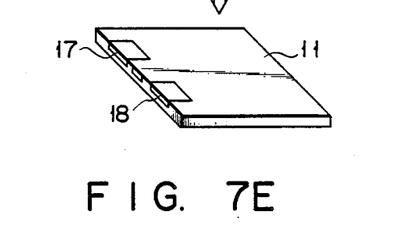

As shown in FIG. 7E, the secondary battery is prepared, and its performance is checked.

The above formation treatment can be performed prior to mounting of cover member 11b. In this case, a plurality of substrates 11a shown in FIG. 7C are dipped in a formation treatment sulfuric acid, and the formation treatment can be performed. This treatment is suitable for mass production.

In the above example, the lead paste is used as both the positive and negative electrode active materials. However, a lead dioxide paste may be used for the positive electrode, and a lead paste may be used for the negative electrode. In this case, the positive and negative electrode patterns are sequentially formed using separate screens. According to this technique, the above formation treatment may be eliminated, and if so, the process for manufacturing the battery can be simplified. However, even in this case, the formation treatment is preferably conducted to improve the electrode properties.

The manufacturing process described above can be performed in an automated treatment line.

Figure 8:
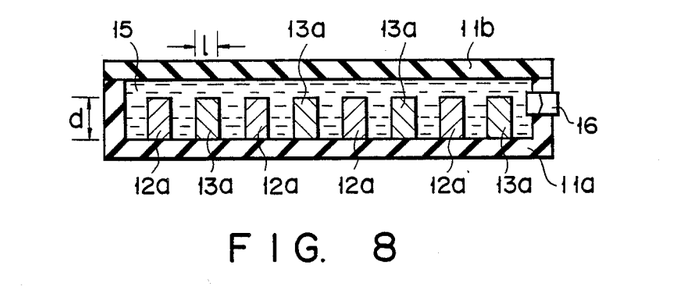
FIG. 8 is a longitudinal sectional view of a secondary battery according to a second embodiment of the present invention.

FIG. 8 is a longitudinal sectional view of a secondary battery according to a second embodiment of the present invention (thickness d of positive electrode tooth 12a and the negative electrode is emphasized with respect to the width, however, in practice, the thickness is much smaller than width 1 of teeth 12a and 13a). The secondary battery according to the second embodiment is substantially the same as that of the first embodiment except that cover member 11b is separated from the upper surfaces of electrode members 12 and 13. In the secondary battery of the second embodiment, its service life is substantially the same as that of the first embodiment. However, the cover member need not be brought into tight contact with the upper surfaces of electrodes 12 and 13, so that the manufacturing process can be simplified. The overall thickness of the secondary battery can be reduced to about ⅓ that of the conventional battery.

EXAMPLE

Figure 13:
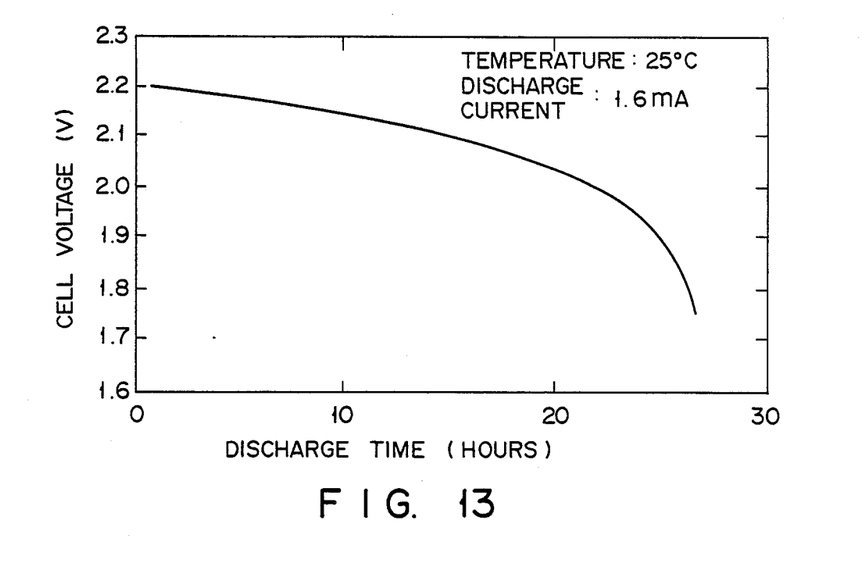
FIG. 13 is a graph showing discharge characteristics of the secondary battery according to the present invention.

A lead storage battery having a structure shown in FIG. 8 was manufactured. Dimensions of the battery were 0.65 mm thick, 50 mm wide, and 78 mm long. The weight of the battery was 4.7 g, and its volume was 2.5 $cm^3$. The thickness of each of electrode members 12 and 13 was 0.4 mm. The discharge characteristics of this lead storage battery are shown in FIG. 13. As is apparent from FIG. 13, a discharge curve exhibits voltage changes unique to the lead storage battery as a function of time. The battery capacity was about 40 mAh. The durability of the battery was satisfactory, and the secondary battery of the present invention had characteristics satisfactory for use in practical applications.

Figure 9:
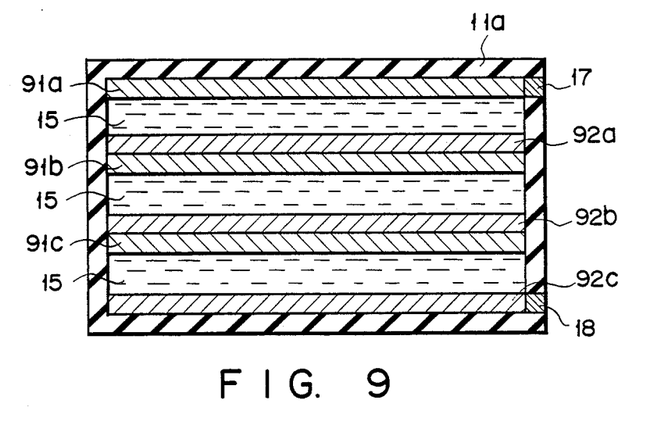
FIG. 9 is a horizontal sectional view of a secondary battery according to a third embodiment of the present invention.

FIG. 9 is a horizontal sectional view of a secondary battery according to a third embodiment of the present invention. In this secondary battery, positive and negative electrode members 91a and 92a opposed to each other at a certain distance constitute one unit cell. Positive and negative electrode members 91b and 92b opposed to each other at a certain distance constitute one unit cell, and positive and negative electrode members 91c and 92c opposed to each other at a certain distance constitute one unit cell. Thin plate-like positive electrode members 91a to 91c and thin plate-like negative electrode members 92a to 92c are formed on substrate 11a. Negative and positive electrode members 92a and 91b are in contact with each other, and negative and positive electrode members 92b and 91c are in contact with each other. A battery reaction does not occur between members 92a and 91b and between members 92b and 91c. The secondary battery has a structure in which three unit cells are connected in series with each other. In addition to the effect of the first embodiment, the secondary battery having the above structure can obtain a cell voltage of a magnitude three times that of the first embodiment.

Figure 10:
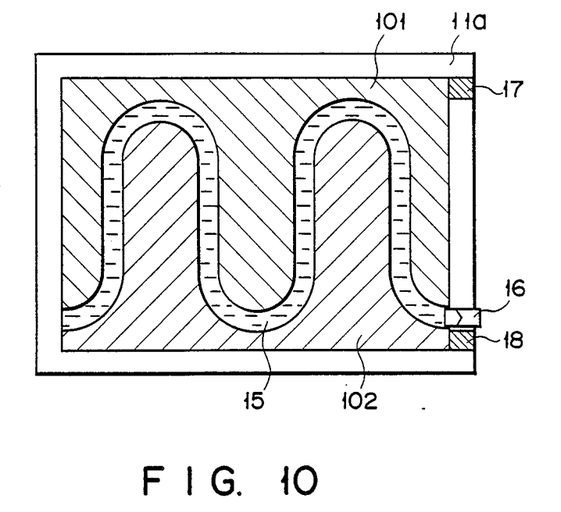
FIG. 10 is a horizontal sectional view of a secondary battery according to a fourth embodiment of the present invention.
Figure 11:
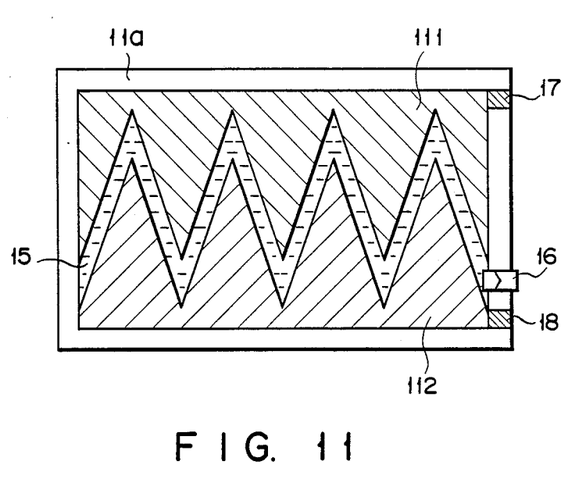
FIG. 11 is a horizontal sectional view of a secondary battery according to a fifth embodiment of the present invention.
Figure 12:
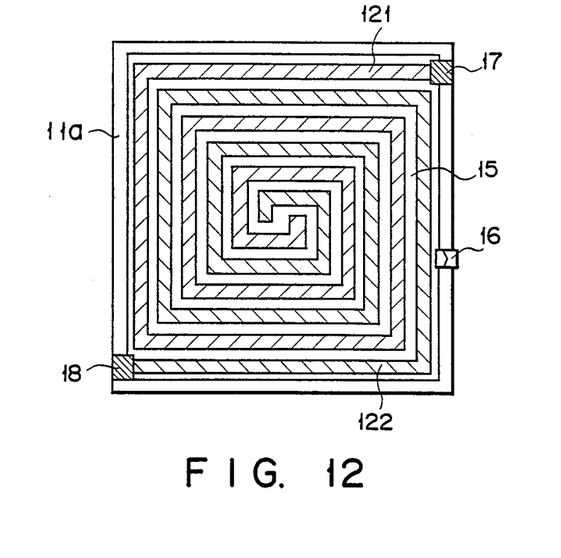
FIG. 12 is a horizontal sectional view of a secondary battery according to a sixth embodiment of the present invention.

FIGS. 10, 11, and 12 are horizontal sectional views of secondary batteries having electrode members of different shapes, respectively.

Referring to FIG. 10, each of positive and negative electrode members 101 and 102 is formed in a wave pattern of a substantially sine curve form having a small thickness.

Referring to FIG. 11, each of positive and negative electrode members 111 and 112 has a saw-toothed shape (or triangular waveform) having a small thickness.

Referring to FIG. 12, each of positive and negative electrode members 121 and 122 has a helical shape having a small thickness.

In the secondary battery according to the present invention as has been described above, since the positive and negative electrode members are fixed on the substrate, the separator need not be used unlike the conventional secondary battery. However, the separator may be arranged as needed. In this case, the separator is arranged between the positive and negative electrode members.

The present invention has been exemplified by the particular embodiments described above but is not limited thereto. For example, teeth 12a and 13a of the secondary batteries of the first and second embodiments have a rectangular shape, but may be a zig-zag shape.

The method of manufacturing a secondary battery according to the present invention is exemplified by screen printing. However, the method of the present invention is not limited thereto. Metal flame spraying, plating, deposition, sputtering, ion plating, or plasma CVD, or a combination thereof may be used to form the electrodes.

According to the present invention as has been described above, the positive plate, the electrolyte, and the negative plate which are the main constituting elements are arranged on a substantially identical plane of the substrate. In addition, the extension direction of the battery reaction sites during charge/discharge is parallel to the electrode surface. Therefore, the resultant secondary battery has excellent durability and a small thickness.

The electrode plate is manufactured by a method including screen printing with a screen pattern. Therefore, various batteries can be manufactured by using only the patterns. In addition, the manufacturing process is simple, and great labor and energy saving can be achieved.

What is claimed is:

1. A secondary battery comprising:
   positive and negative electrode members arranged on a substantially identical plane, the positive and negative electrode members each having main surfaces and end faces, end faces of the positive and negative electrode members being spaced apart and opposing each other at distance;
   a substrate fixedly contacting a main surface of the positive and negative electrode members and fixedly supporting the positive and negative electrode members;
   a cover member defining, with the substrate, a sealed chamber enclosing and covering the positive and negative electrode members; and
   an electrolyte sealed in the sealed chamber, and the cover member being arranged relative to the electrode members such that the electrolyte is substantially present between the opposite end faces of the positive and negative electrode members, the electrolyte being associated with a battery reaction with the positive and negative electrode members, and wherein the electrolyte is present between the end faces of the positive and negative electrode members in an amount sufficient that the battery reaction substantially takes place at battery reaction sites defined between the opposite end faces of the positive and negative electrode members, said battery reaction sites extending substantially perpendicular to the direction of thickness of the positive and negative electrode members.

2. A battery according to claim 1, wherein each of the positive and negative electrode members has a comb-like shape having a plurality of teeth.

3. A battery according to claim 3, wherein the tooth has a rectangular shape.

4. A battery according to claim 1, wherein each of the positive and negative electrode members has a wave-like shape.

5. A battery according to claim 1, wherein each of the positive and negative electrode members has a helical shape.

6. A battery according to claim 1, wherein the positive electrode member comprises lead dioxide, the negative electrode member comprises lead, and the electrolyte comprises diluted sulfuric acid.

7. A battery according to claim 1, wherein each of the positive and negative electrode members has a thickness of not more than 1 mm.

8. A battery according to claim 1, wherein substantially all of said electrolyte is present between the opposite end faces of the positive and negative electrode members.

9. A battery according to claim 1, wherein said cover member contacts main surfaces of said positive and negative electrode members which are opposite to those main surfaces which contact said substrate, whereby all of the electrolyte is between the opposite end faces of the electrode members, the electrolyte not contacting main surfaces of the positive and negative electrode members.

10. A method of manufacturing a secondary battery which is adapted to be repeatedly subjected to cycles of charging and discharging, comprising the steps of:
    applying a positive electrode material containing positive electrode active material and a negative electrode material containing a negative electrode active material to a substrate to form positive and negative electrode members having end faces which oppose each other at a distance, said positive and negative electrode members having main surfaces which are fixed on and juxtaposed on the substrate so as to be supported by the substrate;
    bonding a cover member to the substrate such that the cover member defines, with the substrate, a sealed chamber enclosing and covering the positive and negative electrode members; and
    filling an electrolyte associated with a battery reaction with the positive and negative electrode members into said sealed chamber and the cover member being arranged relative to the electrode member such that the electrolyte is substantially present between the opposite end faces of the positive and negative electrode members, the electrolyte being present between the end faces of the positive and negative electrode members in an amount sufficient to produce with the electrode members a battery reaction which substantially takes place at battery reaction sites defined between the opposite end faces of the positive and negative electrode members and said battery reaction sites extending substantially perpendicular to the direction of thickness of the positive and negative electrode members.

11. A method according to claim 10, wherein the positive and negative electrode members are formed on the substrate by screen printing flame spraying, plating, deposition, sputtering, ion plating, or plasma chemical vapor deposition.

12. A method according to claim 10, wherein each of the positive and negative electrode members has a thickness of not more than 1 mm.

13. A method according to claim 10, further comprising subjecting said positive and negative electrode material applied to said substrate to a formation treatment.

14. A method according to claim 10, wherein said step of filling said electrolyte comprises filling substantially all of said electrolyte in spaces between the opposite end faces of the positive and negative electrode members.

15. A method according to claim 10, wherein the step of bonding the cover member to the substrate comprises contacting the cover member with main surfaces of the positive and negative electrode members are opposite from those main surfaces contacting the substrate, such that the electrolyte is filled in said chamber, all of the electrolyte is present in the spaces between end faces of the positive and negative electrode members, and no electrolyte contacts the main surfaces which are contacted by the cover member.

16. A secondary device, comprising:
a plurality of unit cells juxtaposed adjacent each other on an identical plane, each unit cell comprising pair of positive and negative electrode members arranged on said plane, said positive and negative electrode members each having end faces opposing each other at a distance, the positive electrode member of one unit cell and the negative electrode member of another unit cell in each adjacent two unit cells contacting with each other at respective faces;
a substrate fixedly contacting a main surface of said positive and negative electrode members and fixedly supporting said electrode members o said plurality of unit cells;
a cover member defining, with said substrate, a sealed chamber enclosing and covering said plurality of unit cells; and
an electrolyte sealed in said sealed chamber, and the cover member being arranged relative to the electrode members such that the electrolyte is substantially present between the opposite end faces of the positive and negative electrode members of each unit cell, the electrolyte being present between the end faces of the positive and negative electrode members in an amount sufficient to produce a battery reaction with the positive and negative electrode members of each unit cell, which battery reaction substantially takes place at battery reaction sites defined between opposite end faces of the positive and negative electrode members and said battery reaction sites extending substantially perpendicular to the direction of thickness of the positive and negative electrode members.

17. A device according to claim 16, wherein each of the positive and negative electrode members has a comb-like shape having a plurality of teeth.

18. A device according to claim 17, wherein said teeth of said comb-like shaped electrode members has a substantially rectangular shape.

19. A device according to claim 16, wherein each of the positive and negative electrode members has a wave-like shape.

20. A device according to claim 16, wherein each of the positive and negative electrode members has a helical shape.

21. A device according to claim 16, wherein the positive electrode member comprises lead dioxide, the negative electrode member comprises lead, and the electrolyte comprises diluted sulfuric acid.

22. A device according to claim 16, wherein each of the positive and negative electrode members has a thickness of not more than 1 mm.

23. A device according to claim 16, wherein substantially all of said electrolyte is present between the opposite end faces of the positive and negative electrode members.

24. A device according to claim 16, wherein said cover member contacts main surfaces of said positive and negative electrode members which are opposite to those main surfaces which contact said substrate, whereby all of the electrolyte is between the opposite end faces of the electrode members, the electrolyte not contacting main surfaces of the positive and negative electrode members.

* * * * *